United States Patent
Okajima

(10) Patent No.: US 11,223,587 B2
(45) Date of Patent: Jan. 11, 2022

(54) MESSAGING SYSTEM COMPRISING AN AUXILIARY DEVICE COMMUNICATIVELY COUPLED WITH A CLIENT DEVICE

(71) Applicant: Statum Systems Inc., Wellesley, MA (US)

(72) Inventor: Stephen Michael Okajima, Boston, MA (US)

(73) Assignee: Statum Systems Inc., Wellesley, MA (US)

(*) Notice: Subject to any disclaimer, the term of this patent is extended or adjusted under 35 U.S.C. 154(b) by 0 days.

(21) Appl. No.: 16/892,560

(22) Filed: Jun. 4, 2020

(65) Prior Publication Data

US 2021/0385178 A1 Dec. 9, 2021

(51) Int. Cl.
| | |
|---|---|
| *G06F 15/16* | (2006.01) |
| *G06Q 10/00* | (2012.01) |
| *H04L 12/58* | (2006.01) |
| *H04W 4/80* | (2018.01) |
| *H04W 4/10* | (2009.01) |
| *H04M 1/72412* | (2021.01) |
| *A61B 10/00* | (2006.01) |
| *A61B 5/00* | (2006.01) |

(52) U.S. Cl.
CPC ............ *H04L 51/08* (2013.01); *H04L 51/046* (2013.01); *H04M 1/72412* (2021.01); *H04W 4/10* (2013.01); *H04W 4/80* (2018.02)

(58) Field of Classification Search
USPC .......................................... 709/206, 223–228
See application file for complete search history.

(56) References Cited

U.S. PATENT DOCUMENTS

| | | | |
|---|---|---|---|
| 6,185,198 B1* | 2/2001 | LaDue ............... | H04B 7/18567 370/329 |
| 6,272,117 B1* | 8/2001 | Choi ................. | H04W 74/0866 370/330 |
| 6,278,883 B1* | 8/2001 | Choi ..................... | H04W 48/20 455/552.1 |
| 7,031,838 B1* | 4/2006 | Young ................... | G16H 40/67 702/2 |
| 7,337,316 B1* | 2/2008 | Evans ..................... | H04L 63/12 380/262 |
| 2007/0239610 A1* | 10/2007 | Lemelson .............. | G06Q 10/00 705/51 |
| 2007/0244724 A1* | 10/2007 | Pendergast ............ | G16H 40/63 705/3 |
| 2018/0268937 A1* | 9/2018 | Spetzler ................ | G06F 3/0484 |
| 2019/0155802 A1* | 5/2019 | Miller .................. | G06F 16/3334 |
| 2019/0155803 A1* | 5/2019 | Miller .................... | G06F 16/26 |
| 2019/0155804 A1* | 5/2019 | Miller .................... | G06Q 10/00 |

\* cited by examiner

*Primary Examiner* — Jude Jean Gilles
(74) *Attorney, Agent, or Firm* — Schwegman Lundberg & Woessner, P.A.

(57) ABSTRACT

A notification system to display notifications at a client device by performing operations that include: coupling, via a communication pathway, a client device with an auxiliary device, the auxiliary device comprising a receiver configured to receive data packets from a pager network; receiving, at the auxiliary device, a data packet that comprises a reference to a data object; and causing the auxiliary device to transmit the reference to the data object to the client device via the communication pathway.

20 Claims, 11 Drawing Sheets

MESSAGING SYSTEM COMPRISING AN AUXILIARY DEVICE COMMUNICATIVELY COUPLED WITH A CLIENT DEVICE

TECHNICAL FIELD

The present invention relates to systems and methods to generate and present notifications at client devices.

BACKGROUND

Pagers are typically one-way radio communication systems which operate through a robust network of high-power pager towers. The pager network provides a number of benefits over cellular and Wireless-Fidelity (Wi-Fi) networks, including far greater range, and higher signal penetration. Pagers are therefore often used in geographic locations where other networks are unavailable, and in applications where reliability is of tantamount importance. While the existing pager systems provide the above-mentioned advantages over cellular and Wi-Fi options, they typically lack the significant processing power of modern smartphones, along with the accompanying rich media interfaces.

Accordingly, there is a need for a system which combines the benefits of all of the above systems into a single unified platform, which provides the robust network reliability of the pager network, and the ability to effectively convey information to users through graphical user interfaces.

BRIEF DESCRIPTION OF THE DRAWINGS

Some embodiments are illustrated by way of example and not limitation in the figures of the accompanying drawings in which.

DETAILED DESCRIPTION

Figure 1:
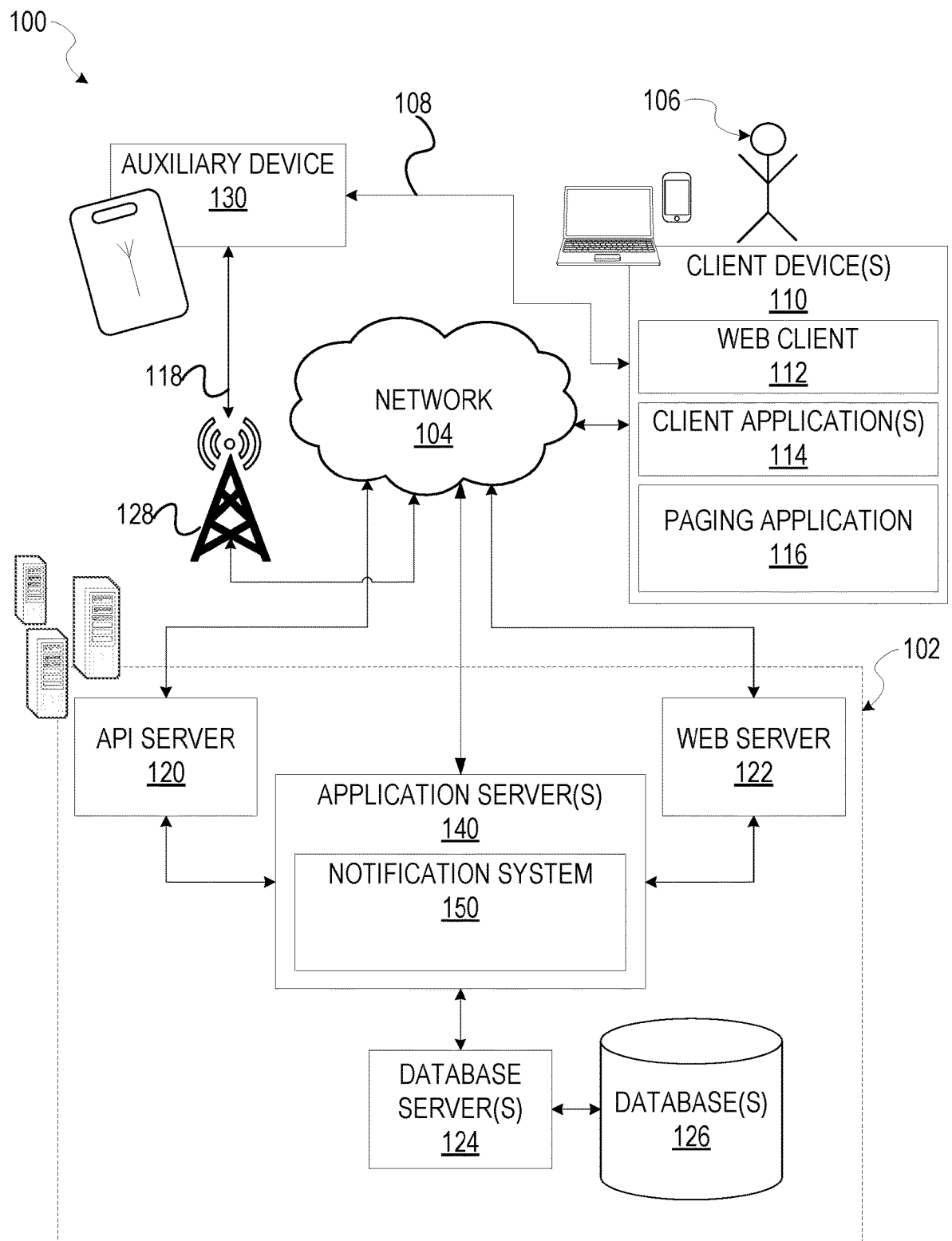
FIG. 1 is a network diagram depicting a client-server system, within which one example embodiment may be deployed.

Reference will now be made in detail to specific example embodiments for carrying out the inventive subject matter. Embodiments may be practiced without some or all of these details. It will be understood that the forgoing disclosure is not intended to limit the scope of the claims to the described embodiments. On the contrary, it is intended to cover alternatives, modifications, and equivalents as may be included within the scope of the disclosure as defined by the appended claims. In addition, well known features may not have been described in detail to avoid unnecessarily obscuring the subject matter.

As discussed above, while traditional pagers provide a number of benefits over cell and Wi-Fi networks, including greater range, and higher signal penetration, they lack the significant processing power of modern smartphones, and the ability to present rich media interfaces to visually convey information. The disclosed system therefore provides an improvement over existing systems, by providing an auxiliary device that may be communicatively coupled with a client device via a wireless connection, and wherein the auxiliary device comprises a transceiver to receive signals (i.e., data packets) from a pager network.

Accordingly, in certain example embodiments, a notification system may be configured to display notifications at a client device by performing operations that include: coupling, via a communication pathway, a client device with an auxiliary device, the auxiliary device comprising a receiver configured to receive data packets from a pager network; receiving, at the auxiliary device, a data packet that comprises a reference to a data object; and causing the auxiliary device to transmit the reference to the data object to the client device via the communication pathway.

Responsive to receiving the data packet that comprises the reference to the data object at the client device from the auxiliary device, an application executed by the client device may access the data object by dereferencing the reference. In some embodiments, the data object may include one or more of: a notification data object, wherein the notification data object comprises a set of notification attributes that define notification properties; a record within a database, wherein the record within the database may contain text data as well as media data (i.e., images, videos, audio clips); a user identifier; as well as a location identifier. In such embodiments, the client device may access the one or more data objects referenced by the data packet in order to generate and cause display of a notification at the client device, wherein properties of the notification may be defined by the data objects. Accordingly, the data object may comprises a series of characters (i.e., a series of ASCII characters) to encode bit data, wherein the series of characters are not themselves actually parsed for display at a device, but rather serve as a reference to a memory location of a data object located in a database, wherein the data object may include media (i.e., images, videos, graphics), as well as textual data (i.e., a text string).

A reference as used herein may be defined as a value that enables an application executed at the mobile device to indirectly access a particular datum (i.e., the data object), such as a variable's value, or a record in a memory of the client device, or in some other storage device, such as a third party server. In certain embodiments, the reference may also include another means of identifying a data object, such as a key, or identifier, wherein the key or identifier uniquely identify the data object through a lookup operation in a data table. In some embodiments, the reference may comprise a sequence of alphanumeric characters, as well as a sequence of non-alphanumeric characters.

For example, in certain embodiments, the reference may include a reference to a record within a data table located within a memory of the client device, or within a third-party database, such as an Electronic Health Record (EHR). Accordingly, upon receiving the reference, the client device may dereference the reference, and cause display of a presentation of the record, or a portion of the record.

In some embodiments, the data packet may comprise a plurality of references, keys, or identifiers that may be used by the client device to access a set of data objects. For example, in certain embodiments, the client device may maintain multiple data tables, wherein each data table comprises a set of data objects, and wherein the data packet comprises references to data objects from one or more of the data tables. Responsive to receiving the data packet, the client device may access the appropriate data tables based on the references in order to generate and cause display of a notification.

In some embodiments, a set of records may be stored within one or more local databases of the client device, wherein the set of records correspond with a set of records located at a server system. In such embodiments, the client device may be configured to update the one or more local databases of the client device responsive to detection of certain trigger conditions or based on an explicit request received from the client device. Trigger conditions may for example include: detecting access to a Wi-Fi network; detecting access to a cell network; determining a threshold period of time has passed since an update to the databases was performed; receiving a push-notification from a server system, wherein the push-notification includes an indication that a record has been updated or changed; detecting that the client device has transgressed a boundary of a geo-fence; and receiving a request from the client device, wherein the request may be a request to update the databases, or a request to login to an application executed by the client device.

Consider an illustrative example from a user perspective. A user of a first client device may provide inputs that select one or more of: a record of a database; a status indicator; a user identifier; and a notification type. Responsive to receiving the inputs, a notification system may generate a data packet that comprises references to the selections, wherein the references may be based on corresponding identifiers. The notification system identifies an auxiliary device associated with the user identifier, wherein the auxiliary device is communicatively coupled with a second client device, and transmits the data packet to the auxiliary device via the pager network. Upon receipt of the data packet at the auxiliary device, the auxiliary device transmits the data packet that includes the references to the second client device. Through an application executed by the second client device, the selections may be dereferenced based on the corresponding references, and a notification may be generated and displayed at the client device, wherein properties of the notification may be based on the selections. For example, the selected notification type may correspond with a set of notification attributes within a data table at the second client device, the record may correspond with a record within a data table of the second client device, and the status indicator may correspond with a set of notification elements within a data table at the second client device. The second client device may therefore generate and cause display of a notification based on the received references.

FIG. 1 is an example embodiment of a high-level client-server-based network architecture 100. A networked system 102 provides server-side functionality via a network 104 to one or more client devices 110, and to a pager network 128 which distributes data to an auxiliary device 130 via the communication channel 118. FIG. 1 illustrates, for example, a web client 112 (e.g., a browser, such as the Internet Explorer® browser developed by Microsoft® Corporation of Redmond, Wash. State), client application(s) 114, and an enhanced paging application 116 executing on the one or more client devices 110.

The client devices 110 may comprise, but are not limited to, a wearable device, mobile phone, desktop computer, laptop, portable digital assistant (PDA), smart phone, tablet, ultra-book, netbook, laptop, multi-processor system, microprocessor-based or programmable consumer electronics, game console, set-top box, or any other communication device that a user may utilize to access the networked system 102. In some embodiments, the client devices 110 comprise a display module (not shown) to display information (e.g., in the form of user interfaces). In further embodiments, the client devices 110 comprise one or more of touch screens, accelerometers, gyroscopes, cameras, microphones, global positioning system (GPS) devices, and so forth. A client device 110 may be a device of a user configured to facilitate communication within the networked system 102. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, a Wireless Mesh Network (WMN), or a combination of two or more such networks.

The client devices 110 may include one or more client applications 114 (also referred to as "apps") such as, but not limited to, a web browser, messaging application, electronic mail (email) application, a navigation application, and the like. In some embodiments, the client application(s) 114 is configured to locally provide the user interface and at least some of the functionalities with the client application(s) 114 configured to communicate with the networked system 102, on an as needed basis, for data or processing capabilities not locally available (e.g., access to a database of records, to authenticate a user, to perform encyrption). Conversely, the client device 110 may use its web browser to access data hosted on the networked system 102 to generate and provide various user interfaces.

An auxiliary device 130 may be communicatively coupled to the client device 110 via one or more communication pathways 108. For example, the communication pathways 108 may be an indirect communicative connection or direct communicative connection (e.g., without intervening components), whether wired or wireless, including but not limited to connections such as electrical, optical, magnetic, and near-field communication (NFC). For example, in some embodiments, the auxiliary device 130 may be communicatively coupled to the client device via Bluetooth or Bluetooth Low Energy (BLE). In some embodiments, the auxiliary device 130 may include one or more antenna, wherein the antenna are tuned to receive data via one or more specified communication bands, including but not limited to Very High Frequency (VHF), and in some instances Ultra High Frequency (UHF) bands. VHF, and in some instances, UHF, bands of the radio spectrum offer higher signal penetration and range than higher frequency bands typically used in Wi-Fi and cellular networks. Accordingly, the auxiliary device 130 may be configured to receive data via a 4-bit Binary-coded decimal (BCD) values, pure bit data, as well as 7-bit American Standard Code for Information Interchange (ASCII). According to such embodiments, the network 104 may additionally include a pager network, wherein the pager network comprises a plurality of transmitter antennas configured to distribute data to the auxiliary device 130 (i.e., an auxiliary device 130) via a communication pathway 118 that comprises a predefined set of frequencies, including but not limited to VHF and UHF. For example, the auxiliary device 130 may comprise one or more transceivers and antenna configured to receive data over frequency ranges that include: 25 MHz-54 MHz; 66 MHz-88 MHz; 138 MHz-175 MHz; 406 MHz-422 MHz; 435 MHz-512 MHz; and 929 MHz-932 MHz.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input, alphanumeric input, text-to-speech, or speech-to-text) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application server(s) 140 may host an notification system 150, for providing encrypted communications between an application server 140 (e.g., a server system), and the client device 110. For example, a notification system 150 may generate data packets in response to requests from a client device 110, and cause a pager network 128 to transmit the data packets, or portions of the data packets, to an auxiliary device (e.g., the auxiliary device 130) coupled to the client device 110. The client device 110 may then receive the data packets from the auxiliary device 130, wherein the data packets may comprise references to one or more data objects located within a data table of a database 126 which may be local to the client device 110, or at a server system distributed from the client device 110.

While the client-server-based network architecture 100 shown in FIG. 1 employs a client-server architecture, the present inventive subject matter is of course not limited to such an architecture, and could equally well find application in a distributed, or peer-to-peer, architecture system, for example. The notification system 150 could also be implemented as standalone software programs, which do not themselves necessarily have networking capabilities, but may work in conjunction with separate networking applications.

The web client 112 may access the various systems of the application servers 140, including the notification system 150, via the web interface supported by the web server 122. Similarly, the paging application 116 accesses the various services and functions provided by the notification system 150 via the programmatic interface provided by the API server 120. The paging application 116 may, for example, generate and cause display of notifications in response to receiving a data packet from an associated auxiliary device 130, wherein the data packet may contain a reference to a memory location of the databases 126.

Figure 2:
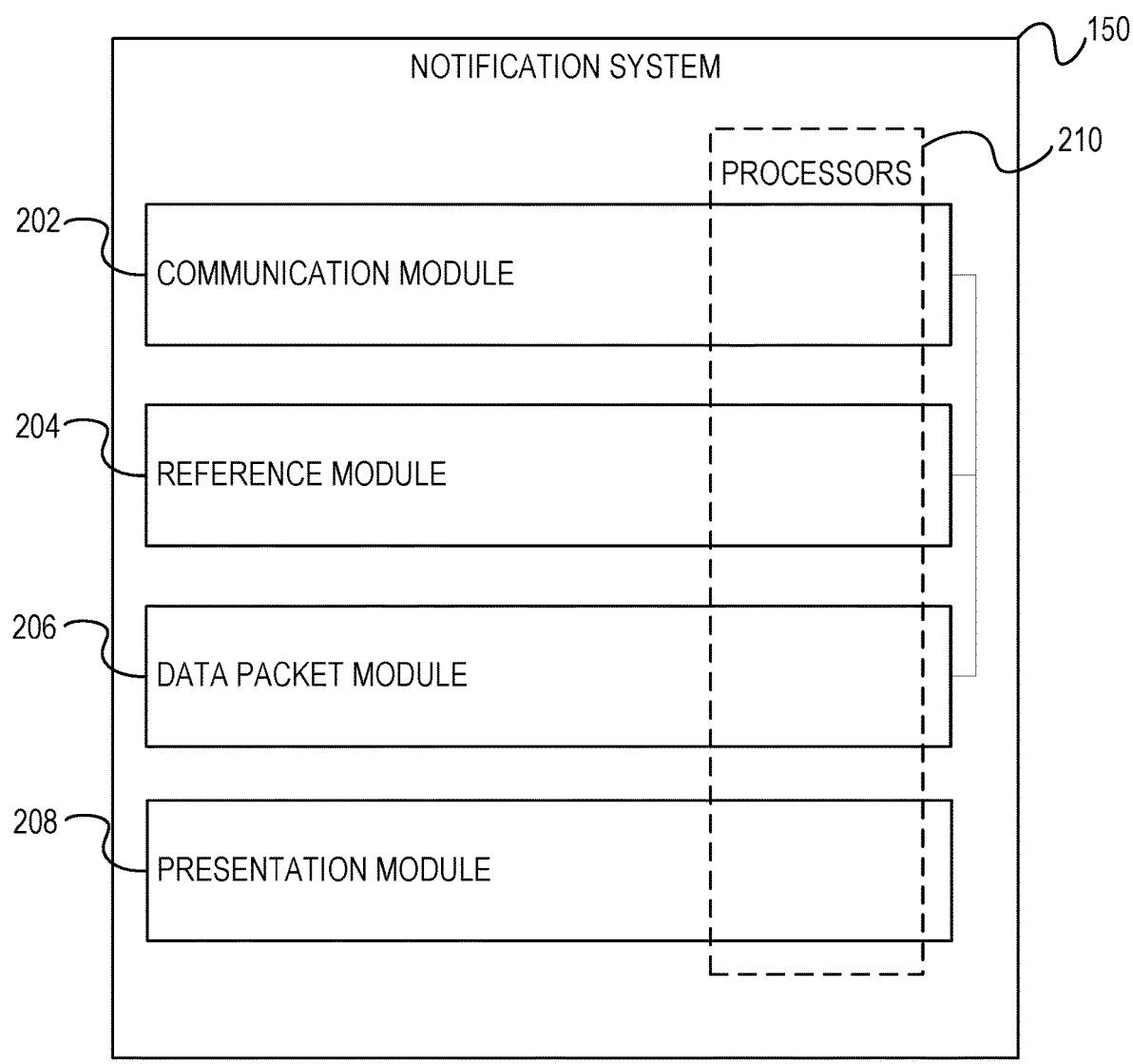
FIG. 2 is a block diagram illustrating components of a notification system, according to some example embodiments.

FIG. 2 is a block diagram illustrating components of the notification system 150 that configure the notification system 150 to perform operations that in some embodiments include: coupling, via the communication pathway 108, an auxiliary device 130 with a client device 110, wherein the auxiliary device 130 comprises a receiver configured to receive data packets via the pager network 128 through the communication pathway 118; receiving, at the auxiliary device 130, a data packet that comprises a reference to a data object, wherein the data object may be located within a memory location of a database 126; and causing the auxiliary device 130 to transmit the reference to the data object to the client device 110 via the communication pathway 108, wherein the communication pathway 108 may include a wireless connection. The notification system 150 is shown as including a communication module 202, a reference module 204, a data packet module 206, and a presentation module 208, all configured to communicate with each other (e.g., via a bus, shared memory, or a switch). Any one or more of these modules may be implemented using one or more processors 210 (e.g., by configuring such one or more processors 210 to perform functions described for that module) and hence may include one or more of the processors 210.

Any one or more of the modules described may be implemented using hardware alone (e.g., one or more of the processors 210 of a machine) or a combination of hardware and software. For example, any module described of the notification system 150 may physically include an arrangement of one or more of the processors 210 (e.g., a subset of or among the one or more processors of the machine) configured to perform the operations described herein for that module. As another example, any module of the notification system 150 may include software, hardware, or both, that configure an arrangement of one or more processors 210 (e.g., among the one or more processors of the machine) to perform the operations described herein for that module. Accordingly, different modules of the notification system 150 may include and configure different arrangements of such processors 210 or a single arrangement of such processors 210 at different points in time. Moreover, any two or more modules of the notification system 150 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
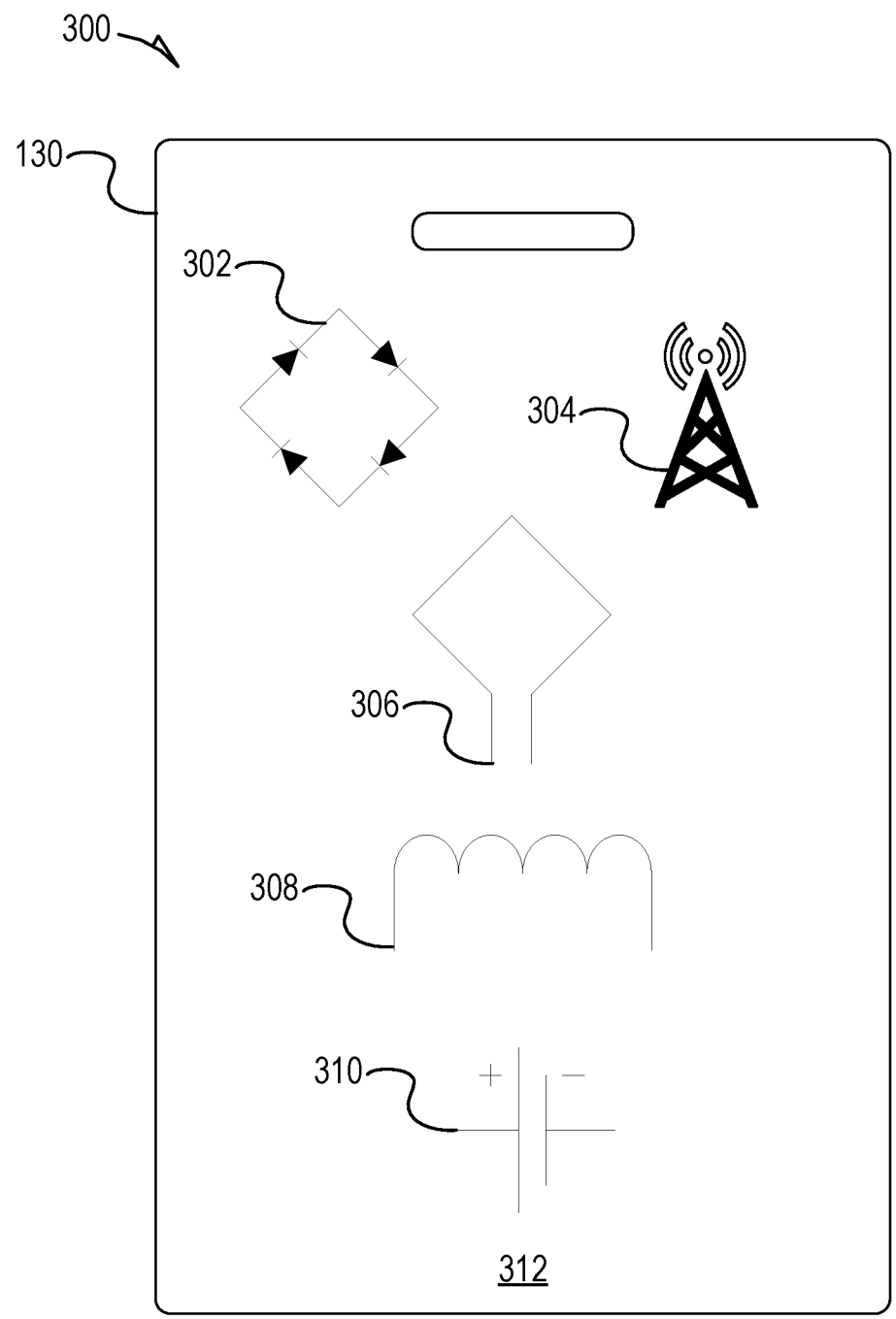
FIG. 3 is a diagram illustrating components of an auxiliary device that may be communicatively coupled with a client device, according to some example embodiments.

FIG. 3 is a diagram 300 illustrating various functional components of an auxiliary device 130 that may be communicatively coupled with the client device 110 via the communication pathway 108. As seen in the diagram 300, the auxiliary device 130 may comprise some or all of a demodulator 302, a transmitter 304, antenna(s) 306, an inductive charging coil 308, and a battery 310, all enclosed within an enclosure 312.

In some example embodiments, the demodulator 302 includes a Frequency Shift Keying (FSK) Demodulator, configured to transmit digital information (e.g., message data) through discrete frequency changes of a carrier signal.

In some example embodiments, the transmitter 304 includes a short-wave radio frequency transmitter (e.g., Bluetooth), configured to forward message data between the auxiliary device 130 and a paired client device 110.

In some example embodiments the antennas 306 include a pair of orthogonal antennas, that may include a loop antenna consisting of a loop of wire, and fully enclosed by the enclosure 312. In some example embodiments, the antennas 306 are integrated into a portion of the enclosure 312. For example, the enclosure 312 may comprise multiple components that come together to form the enclosure 312. In some embodiments, the antennas 306 may be molded or formed into one or more of the components of the enclosure 312. In some embodiments, the antennas 306 may comprise a printed circuit board (PCB) trace around an edge of a PCB, wherein a size and shape of the PCB may be determined based on an operating frequency of the antennas 306.

In some example embodiments, the antennas 306 may be formed into a frame that encompasses a perimeter of a surface of the enclosure 312.

In some example embodiments, the charging coil 308 includes one or more exposed charging leads to enable a use to plug the auxiliary device 130 into an outlet (e.g., USB).

In some example embodiments, the enclosure 312 is the form of a proximity card, such as an identification card, or contactless smart card, or a receptacle to receive and hold an identification card or contactless smart card. In certain embodiments the enclosure 312 may be configured to include a receptacle to receive and hold a card, as depicted in FIG. 4.

Figure 4:
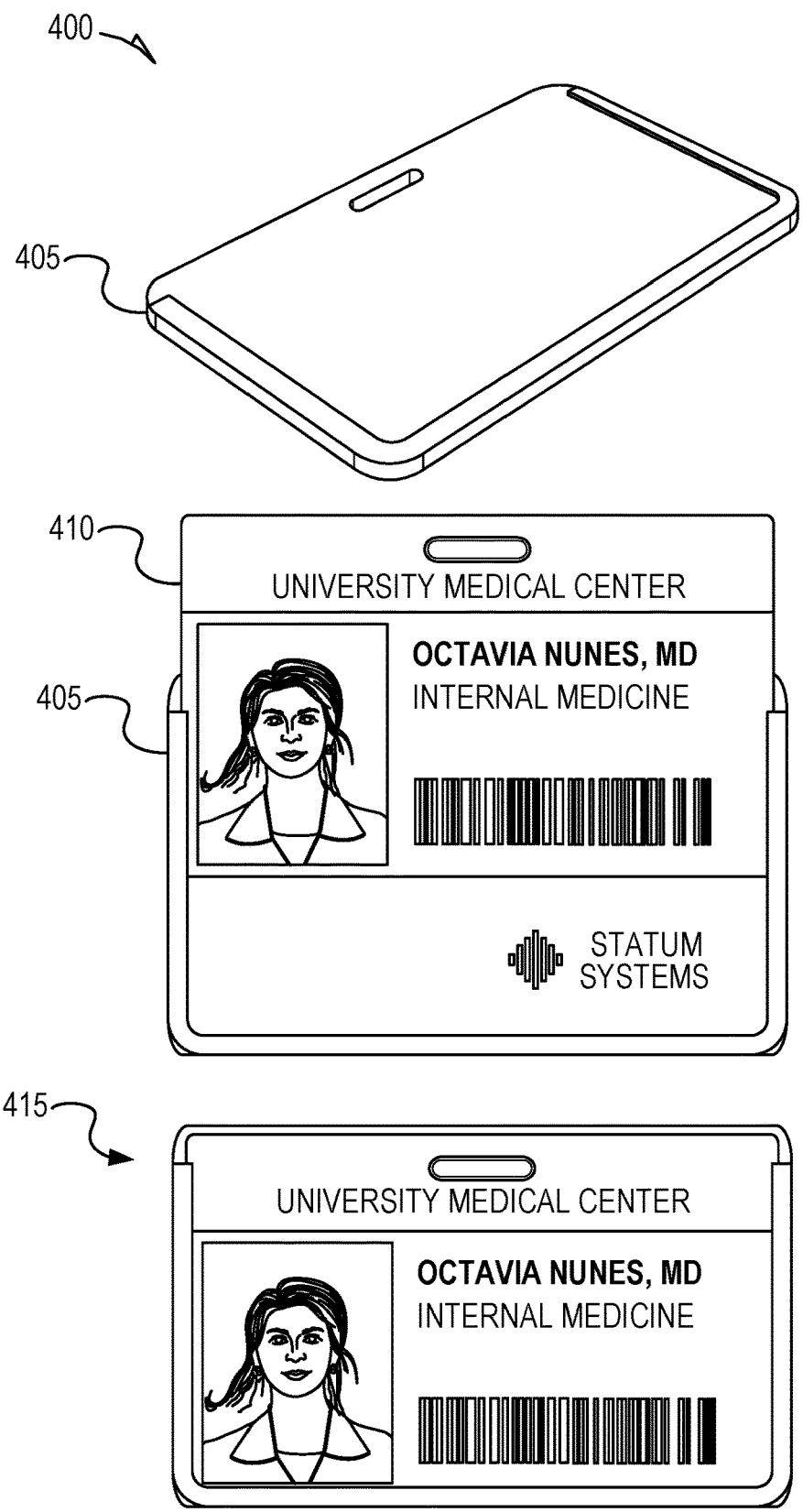
FIG. 4 is a diagram depicting an embodiment of the auxiliary device, according to some example embodiments.

FIG. 4 is a diagram 400 depicting an embodiment of the enclosure 312 of the auxiliary device 130, as depicted in FIG. 3. As seen in the diagram 400, the enclosure 312 of the auxiliary device 130 may comprise a sleeved receptacle to receive and hold a card, such as an identification card.

For example, the enclosure 315 may include the badge holder 405, wherein the badge holder 405 comprises a sleeve along a perimeter of the badge holder 405. As seen in the diagram 400, an identification card 410 may be inserted into the sleeve of the badge holder 405 such that the identification card 405 may be received and held in place by the badge holder 405 as seen in the depiction 415.

Figure 5:
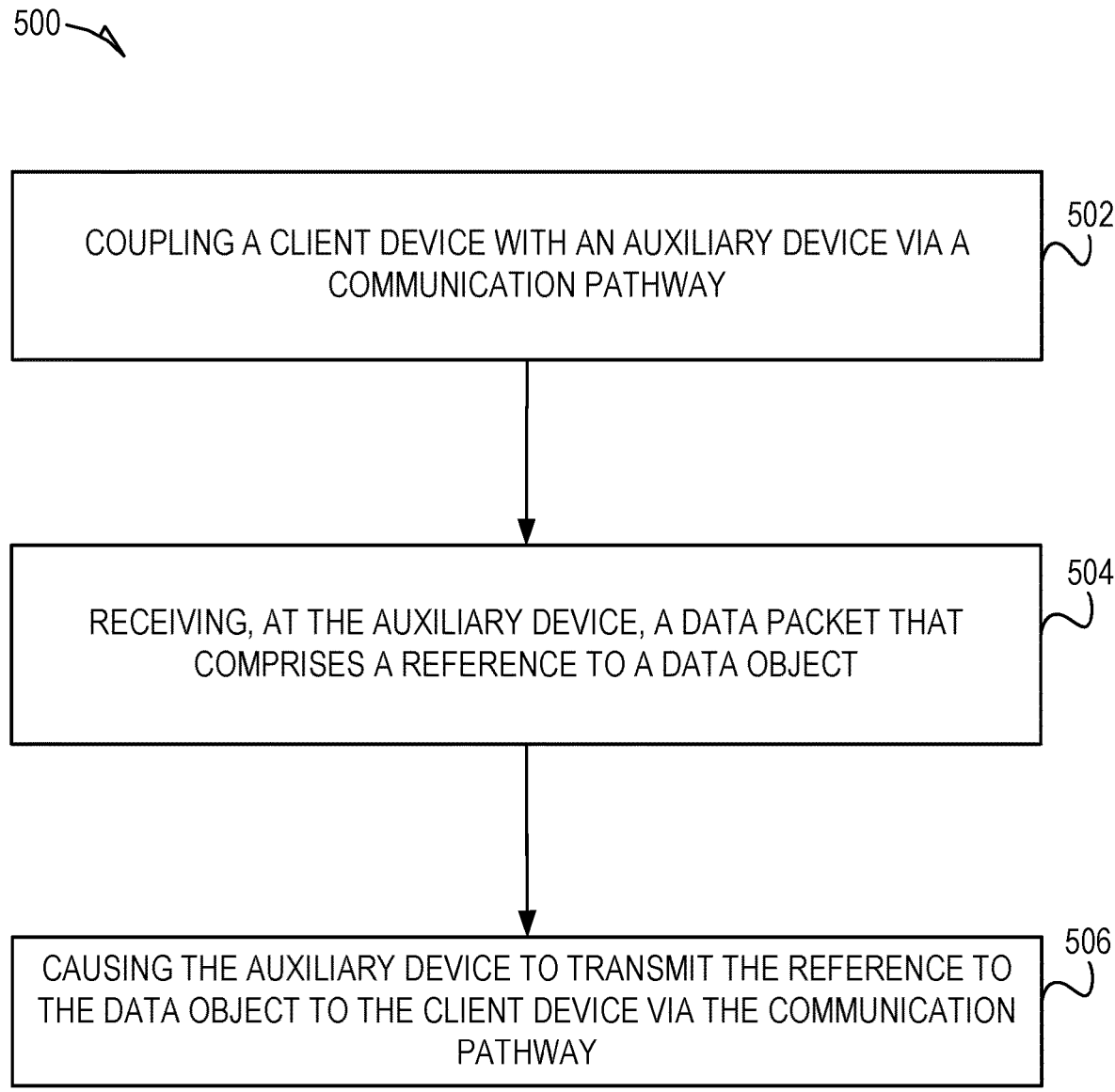
FIG. 5 is a flowchart illustrating a method for distributing a data packet to a client device via an auxiliary device, according to some example embodiments.

FIG. 5 is a flowchart illustrating a method 500 for distributing a data packet to a client device 110 via an auxiliary device 130, according to certain example embodiments. Operations of the method 500 may be performed by the modules described above with respect to FIG. 2. As shown in FIG. 5, the method 500 includes one or more operations 502, 504, and 506.

At operation 502, the communication module 202 couples a client device 110 with an auxiliary device 130 via a communication pathway 108. In some embodiments, the communication pathway 108 may include a Bluetooth connection, while in further embodiments, the communication pathway 108 may include a wired connection.

In some embodiments, the coupling of the auxiliary device 130 with the client device 110 may be based on a request received from the client device 110. For example, the user 106 may provide an input at the client device 110, wherein the input comprises a selection or identification of an identifier associated with the auxiliary device 130. For example, the user 106 may interact with the auxiliary device 130 via the paging application 116. In some embodiments, the paging application 116 may detect a signal from the auxiliary device 130 and cause display of a prompt at the client device 110, wherein the prompt includes a display of an identifier of the auxiliary device 130. Responsive to a selection of the identifier of the auxiliary device 130, the communication module 202 may establish the communication pathway 108 between the auxiliary device 130 and the client device 110.

In some embodiments, the coupling of the auxiliary device 130 with the client device 110 may be based on an input received from an administrator of the notification 150. For example, the administrator of the notification system 150 may provide an input that associates a user identifier associated with the client device 110 with an identifier associated with the auxiliary device 130. Responsive to receiving the input, the communication module 202 may establish the communication pathway 108. In some embodiments, the communication pathway 108 may be encrypted by one or more encryption protocol.

At operation 504, the auxiliary device 130 receives, via the communication pathway 118, a data packet that comprise a reference to a data object. The communication pathway 118 may include a communication pathway established by the pager network 128. According to certain embodiments, the reference to the data object may be a reference to a memory location of a data table or database (i.e., the databases 126), wherein dereferencing the reference returns the data object from a corresponding memory location. In some embodiments, the reference to the data object may further comprise an identification of a data table or database in which the data object is located, in addition to an indication of a specific memory location of the data object within said database.

At operation 506, the auxiliary device 130 transmits the reference to the data object from the data packet to the client device 110 via the communication pathway 108. In some embodiments, the communication pathway 108 may be encrypted based on one or more encryption protocols. In some embodiments, the auxiliary device 130 may transmit the entire data packet to the client device 110, while in further embodiments, the auxiliary device 130 may parse the reference to the data object from the data packet, and transmit just the reference to the data object to the client device 110. The method 500 may then continue as discussed in the method 600 of FIG. 6.

Figure 6:
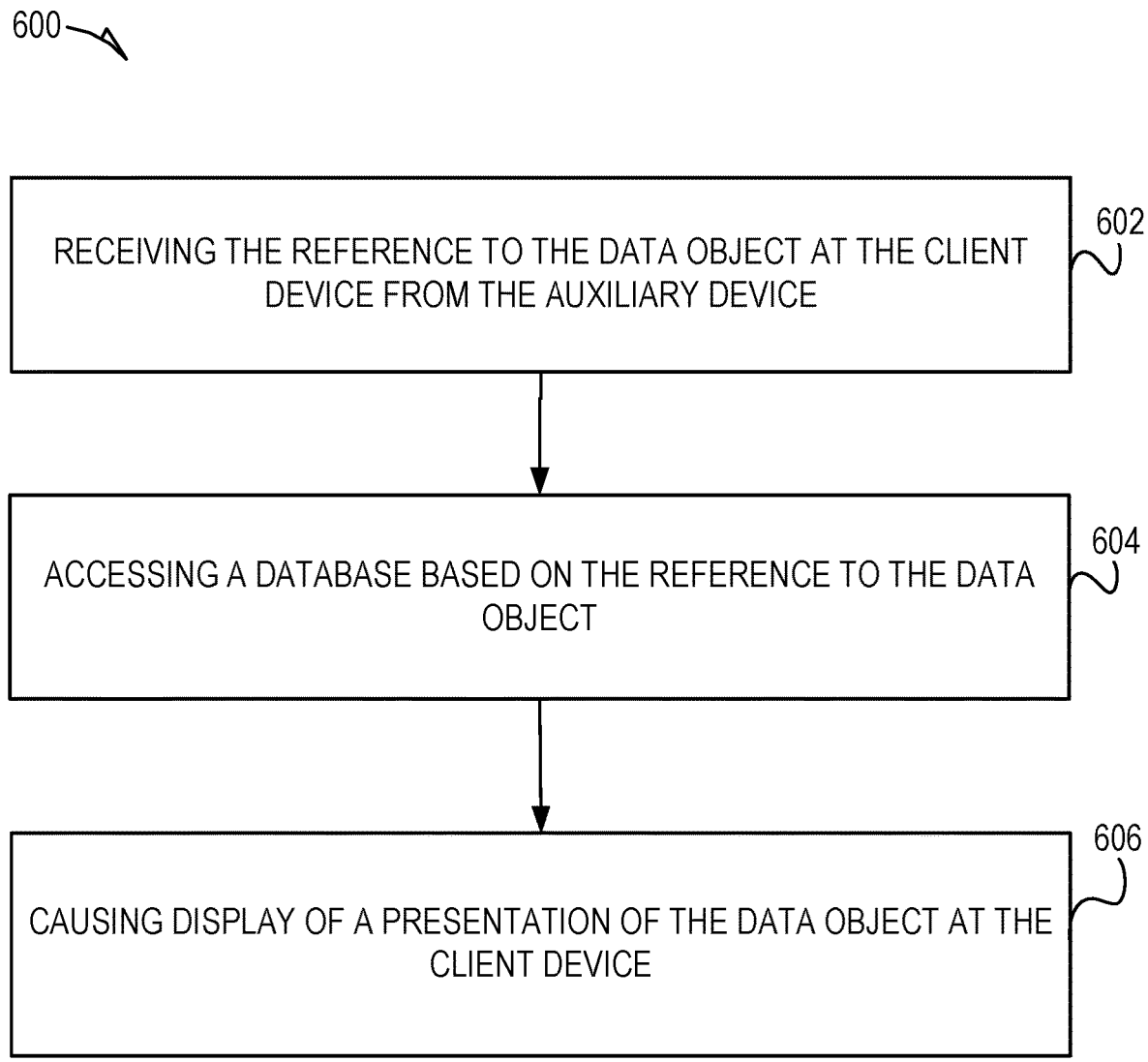
FIG. 6 is a flowchart illustrating a method for causing display of a presentation of a data object at a client device, according to some example embodiments.

FIG. 6 is a flowchart illustrating a method 600 for causing display of a presentation of a data object at a client device 110, according to certain example embodiments. Operations of the method 600 may be performed by the modules described above with respect to FIG. 2. As shown in FIG. 6, the method 600 includes one or more operations 602, 604, and 606.

At operation 602, the client device 110 receives the reference to the data object from the auxiliary device via the communication pathway 108. Responsive to receiving the reference to the data object at the client device 110, the reference module 204 may identify a database (i.e., the database 126) based on one or more attributes of data packet or reference.

At operation 604, the reference module 204 accesses the data object from a corresponding memory location of a database based on the reference received in the data packet. For example, the database may include a local database of the client device 110, or a database which may be accessed via the network 104.

At operation 606, the presentation module 208 generates and causes display of a presentation of the data object at the client device 110. For example, the data object may include a record of a database (or multiple records from multiple databases), wherein the record comprises accompanying display attributes and properties. The presentation module 208 may generate a presentation of the data object based on its corresponding properties.

As an illustrative example, the client device 110 may maintain a plurality of databases, wherein each database comprises a collection of data objects. In the context of a hospital environment, the databases may for example include: a patient directory, that comprises patient records that include names of patients and corresponding reference identifiers; a condition directory, wherein the condition directory comprises a collection of records that correspond with various health record conditions, such as records found within an Electronic Health Record, along with corresponding reference identifiers; a patient status directory, wherein the patient status directory may comprise a listing of possible patient status (i.e., discharge, critical, transferred), along with corresponding reference identifiers. The references received in the data packet may therefore refer to one or more of the above mentioned records, such that receipt of such a data packet may cause the presentation module 208 to access the dereferenced data objects and generate a notification (i.e., a presentation of the data object) to be presented at the client device 110. Further examples of notifications generated and displayed by the presentation module 208 may be seen in FIG. 9 and FIG. 10, such as the notification 925 of FIG. 9, and the notification 1010 of FIG. 10.

Figure 7:
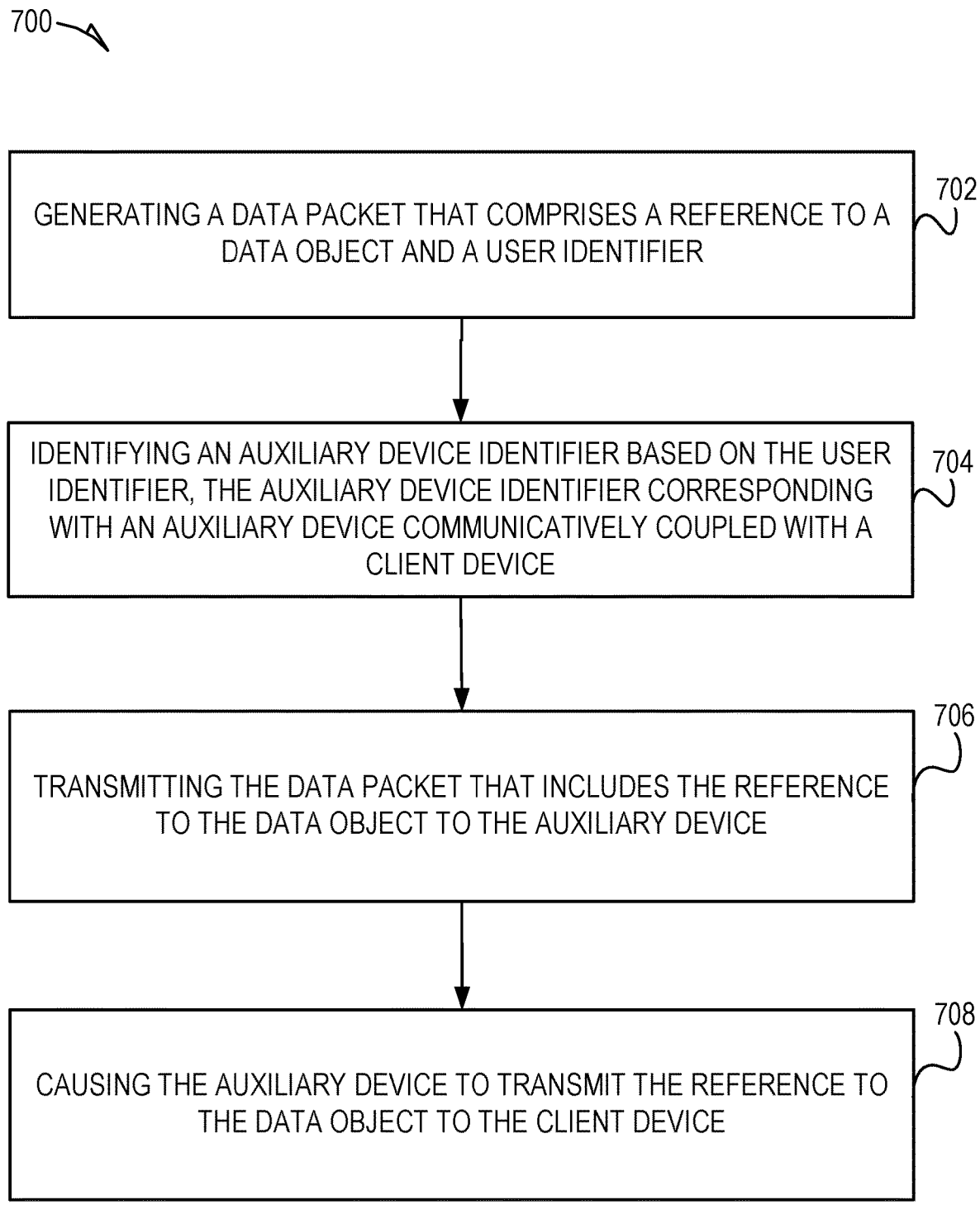
FIG. 7 is a flowchart illustrating a method distributing a data packet to a client device via an auxiliary device, according to some example embodiments.

FIG. 7 is a flowchart illustrating a method 700 for distributing a data packet to a client device 110 via an auxiliary device 130, according to certain example embodiments. Operations of the method 700 may be performed by the modules described above with respect to FIG. 2. As shown in FIG. 7, the method 700 includes one or more operations 702, 704, 706, and 708. According to certain embodiments, the method 700 may be performed as a subroutine or precursor of the method 500 depicted in FIG. 5, and the method 600, depicted in FIG. 6.

Figure 10:
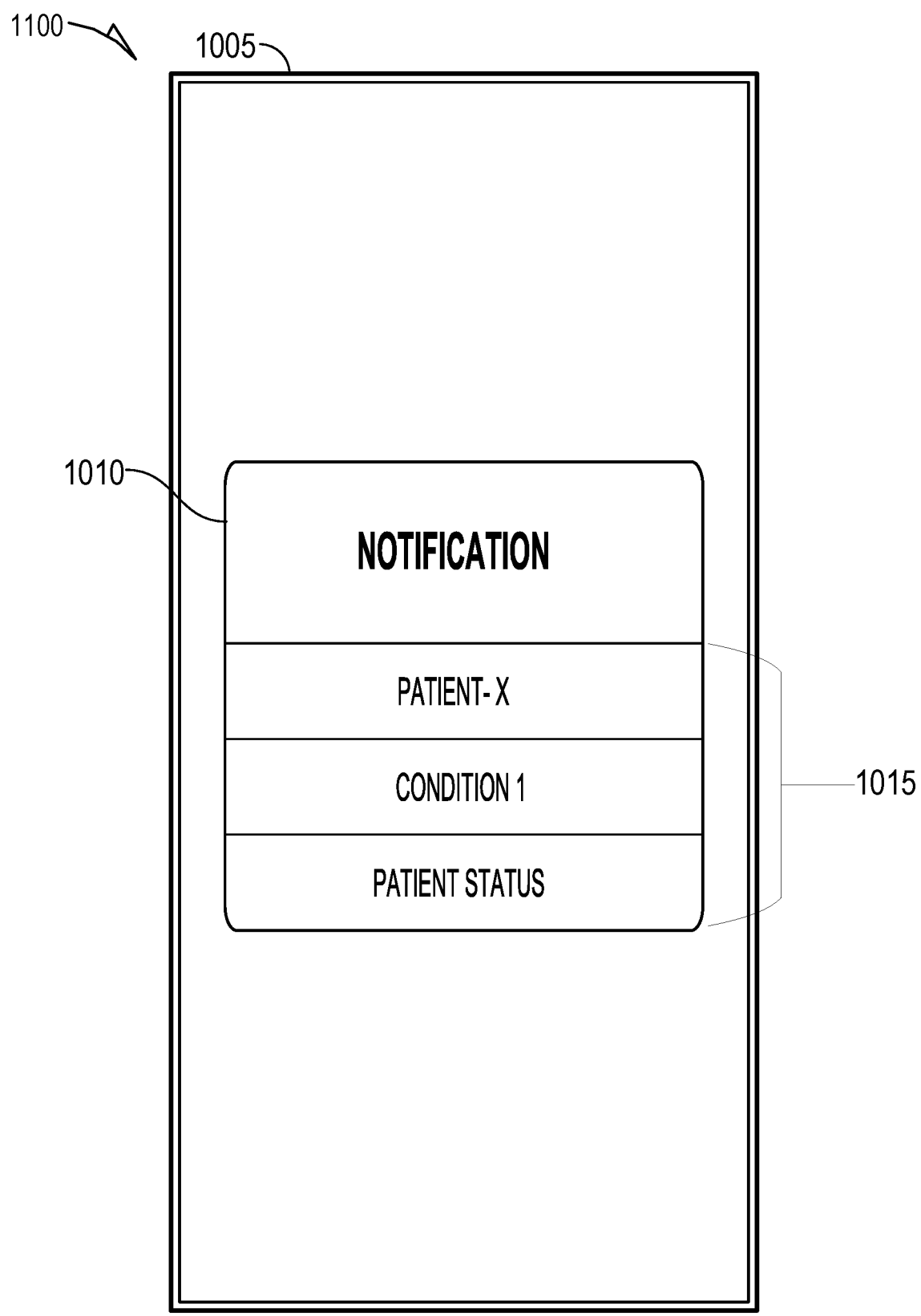
FIG. 10 is an interface diagram depicting a notification generated and presented by a notification system, according to certain example embodiments.

At operation 702, the data packet module 206 generates a data packet that comprises a reference to a data object and a user identifier. According to certain embodiments, a data object may include one or more of: a time or date; a user identifier; a reference to a UI/UX element; a database element; an encryption key; a text string; media, including images, videos, and audio data. For example, as depicted in FIG. 10, a user of a client device 110A may provide an input through the interface element 905 that comprises a selection of one or more data objects, such as a patient identifier, a selection of a condition identifier via the menu element 910, and a selection of a user identifier 920, wherein each of the selections have corresponding reference identifiers.

At operation 704, the reference module 204 identifies an auxiliary device identifier based on the user identifier of the data object. For example, the user identifier and auxiliary device identifier may be associated with one another in a database responsive to receiving an indication that a communication pathway 108 is established between the auxiliary device 130 and the client device 110.

At operation 706, the communication module transmits the data packet that includes the reference to the data object(s) to the auxiliary device 130 via the communication pathway 118, wherein the auxiliary device 130 is communicatively coupled with the client device 110.

Figure 9:
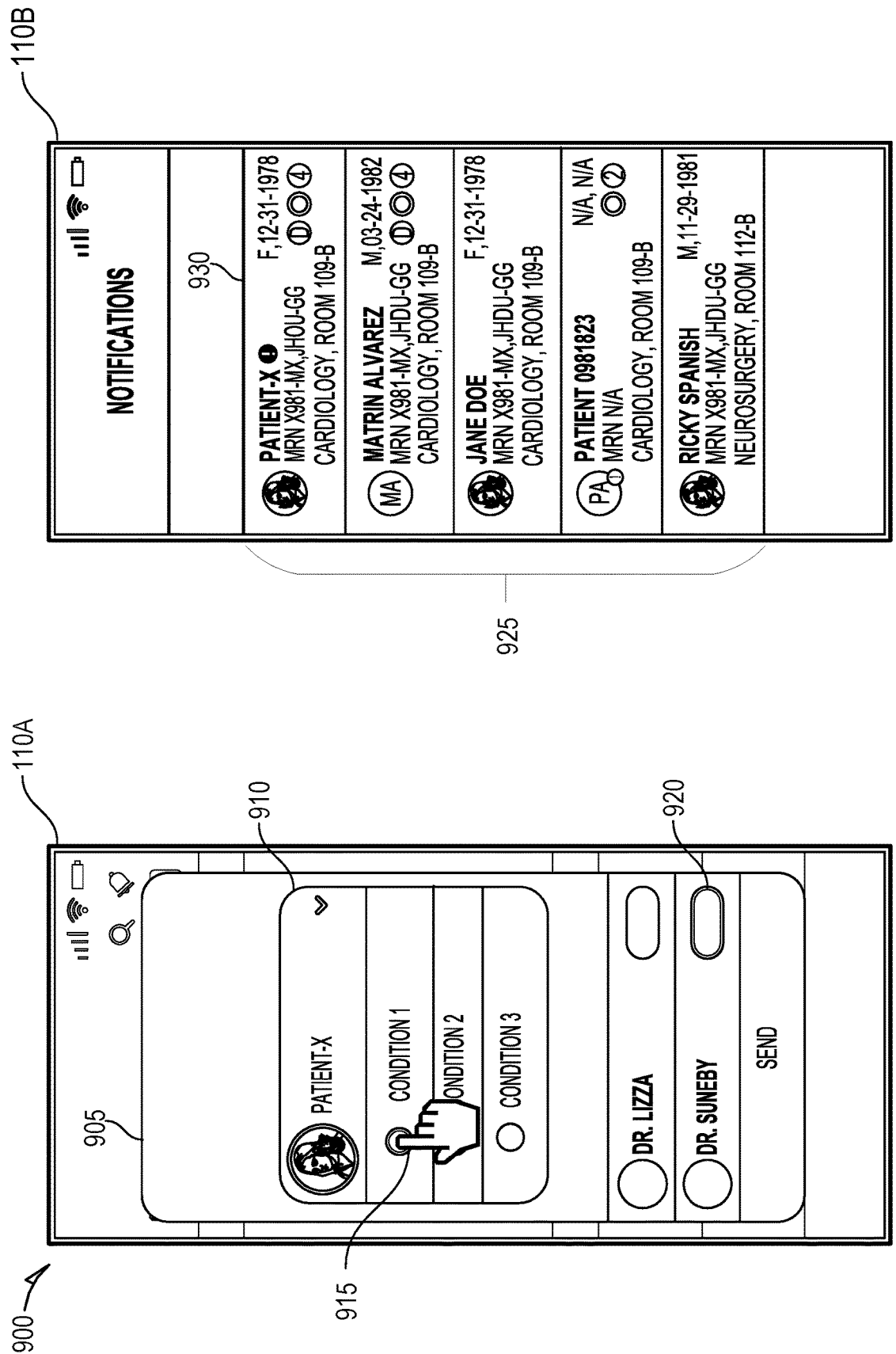
FIG. 9 is an interface flow-diagram depicting interfaces generated and displayed by a notification system, including an interface to configure a notification and an interface to display a notification based on a reference to a data object, according to certain example embodiments.

Responsive to receiving the data packet at the auxiliary device 130, the auxiliary device 130 may transmit the data packet that includes the reference to the data object(s) to the client device 110 via the communication pathway 108. As seen in FIG. 9, responsive to receiving the data packet at the client device (i.e., the client device 110B), the presentation module may generate and cause display of a presentation that may comprise a notification, such as the notification 930, wherein properties of the notification 930 are based on the selected data objects.

Figure 8:
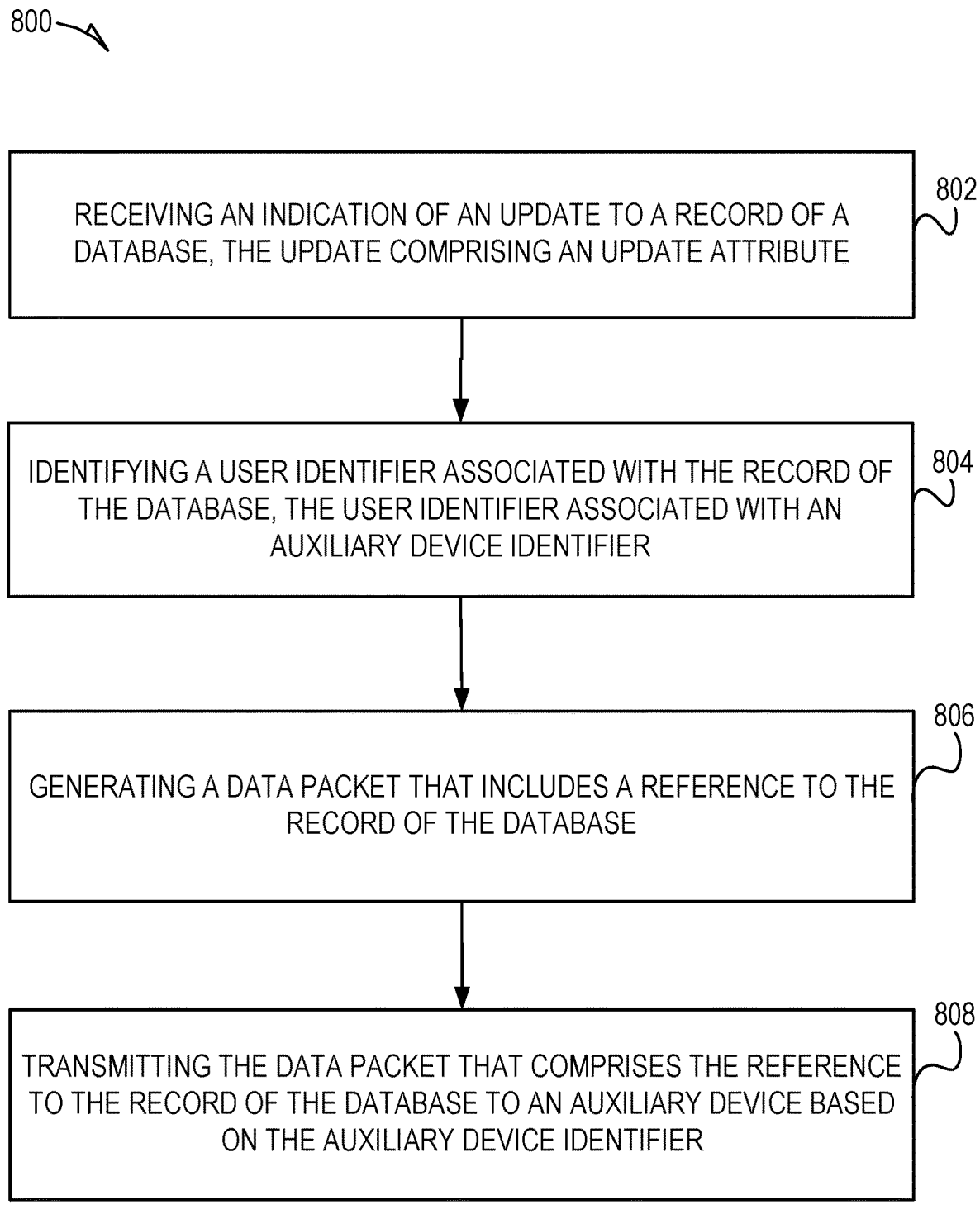
FIG. 8 is a flowchart illustrating a method of transmitting a data packet that includes a reference to a data object to an auxiliary device, according to certain example embodiments.

FIG. 8 is a flowchart illustrating a method 800 of transmitting a data packet that includes a reference to a data object to an auxiliary device 130, according to certain example embodiments. Operations of the method 800 may be performed by the modules described above with respect to FIG. 2. As shown in FIG. 8, the method 800 includes one or more operations 802, 804, 806, and 808. According to certain embodiments, the method 800 may be performed as a subroutine or precursor of the method 500 depicted in FIG. 5, and the method 600, depicted in FIG. 6.

At operation 802, the data packet module 206 detects a trigger event, wherein the trigger event may include an indication of an update to a record of a database, wherein the update comprises an update attribute. For example, the record may include a record of a database 126.

Responsive to receiving the indication of the update to the record of the database, at operation 804, the notification system 150 identifies a user identifier associated with the record of the database, wherein the user identifier is associated with an auxiliary device identifier that corresponds with the auxiliary device 130. For example, the record may include a patient record within an EHR database, and the user identifier may include a user identifier of an attending doctor, or hospital staff, which may be assigned to the patient that corresponds with the patient record. As an illustrative example, the patient record may be updated to indicate a change in status associated with the patient within the EHR database (i.e., the database 126).

At operation 806, the data packet module 206 generates a data packet that comprises one or more of: a reference to the record within the database; a reference to an identifier, such as a patient identifier associated with the record within the database; and a reference that corresponds with the status. In certain example embodiments, the client device 110 may maintain one or more parallel databases, wherein the parallel database comprise collections of data objects that correspond with the above records, or utilize a matching reference identifier convention such that, for example, dereferencing a given reference that corresponds with the status may return a particular status indicator.

At operation 808, the communication module 202 transmits the data packet that comprises the one or more references to the records of the databases to the auxiliary device 130 via the communication pathway 118, based on the auxiliary device identifier associated with the selected user identifier. Responsive to receiving the data packet at the client device 110, the reference module 204 may access one or more databases to retrieve data objects based on the received references, in order to generate and cause display of a presentation of the data objects, as seen in FIG. 9 and FIG. 10.

FIG. 9 is an interface flow-diagram 900 depicting interfaces generated and displayed by the notification system 150, at a client device 110A (a sender of a notification), and a client device 110B (a recipient of the notification), according to certain example embodiments, and as described in the method 500.

The interface element 905 may be presented at a client device 110A in order to generate and send a notification to a client device 110B through the communication pathway 1180 to the auxiliary device 130 which may be communicatively coupled with the client device 110B via a communication pathway 108. As seen in FIG. 9, a user of the client device 110A may provide one or more inputs 915 through the menu element 910 in order to select a number of data objects that each have corresponding reference identifiers, as well as a user identifier 920 that may correspond with a client device 110B (i.e., a recipient of the data packet). FIG. 9 provides an illustrative example in the context of a hospital messaging scenario. As seen in FIG. 9, a user of the client device 110A may provide an input to select: a patient identifier (Patient-X), wherein the patient identifier has a corresponding reference identifier within a database of the client device 110B; a condition from among a set of conditions, wherein each condition among the set of conditions have corresponding reference identifiers within a database of the client device 110B. In further embodiments, further options may be presented within the interface element 905, wherein each option may have corresponding reference identifiers that may be correlated with reference identifiers of databases local to, or accessible by, the client device 110B.

As discussed in FIG. 7, the data packet which may be generated by the inputs received through the interface element 905 of the client device 110A may be transmitted to an auxiliary device 130 which may be communicatively coupled with the client device 110B, and wherein the client device 110B is associated with a selected user identifier, such as the user identifier 920. Accordingly, the client device 110B may receive the data packet from the auxiliary device 130 via the communication pathway 108. Responsive to receiving the data packet at the client device 110B, the presentation module 208 generates and causes display of a presentation of the notification 930 among a set of notification 925.

Properties of the notification 930 may be based on the selections made at the client device 110A. For example, as seen in FIG. 9, the notification 930 may include a number of notification elements, wherein the notification elements are dereferenced at the client device 110B. For example, the data packet received by the client device 110B may comprise one or more reference identifiers that each correlate with various elements presented within the notification 930.

FIG. 10 is an interface diagram 1000 depicting a notification 1010 generated and displayed by a notification system 150 at a client device 110, according to certain example embodiments.

As seen in the graphical user interface 1005, the notification 1010 may include a display of one or more data objects 1015 that may be dereferenced by the client device 110 based on a data packet received at the client device 110 via an auxiliary device 130 which may be communicatively coupled with the client device 110 through a communication pathway 108.

According in certain embodiments, responsive to receiving the data packet, the client device 110 may access one or more databases based on references of the data packet. In some embodiments, the references may reference a third-party database, which may require the client device 110 to establish a connection with the third-party database via the network 104. In further embodiments, the client device 110 may maintain one or more databases that comprise a plurality of data objects, wherein each data objects among the plurality of data objects has a corresponding reference identifier. Accordingly, responsive to receiving a reference within a data packet, the client device 110 may access an appropriate database to retrieve and display the data objects, such as the data objects 1015.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).) ELECTRONIC APPARATUS AND SYSTEM Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
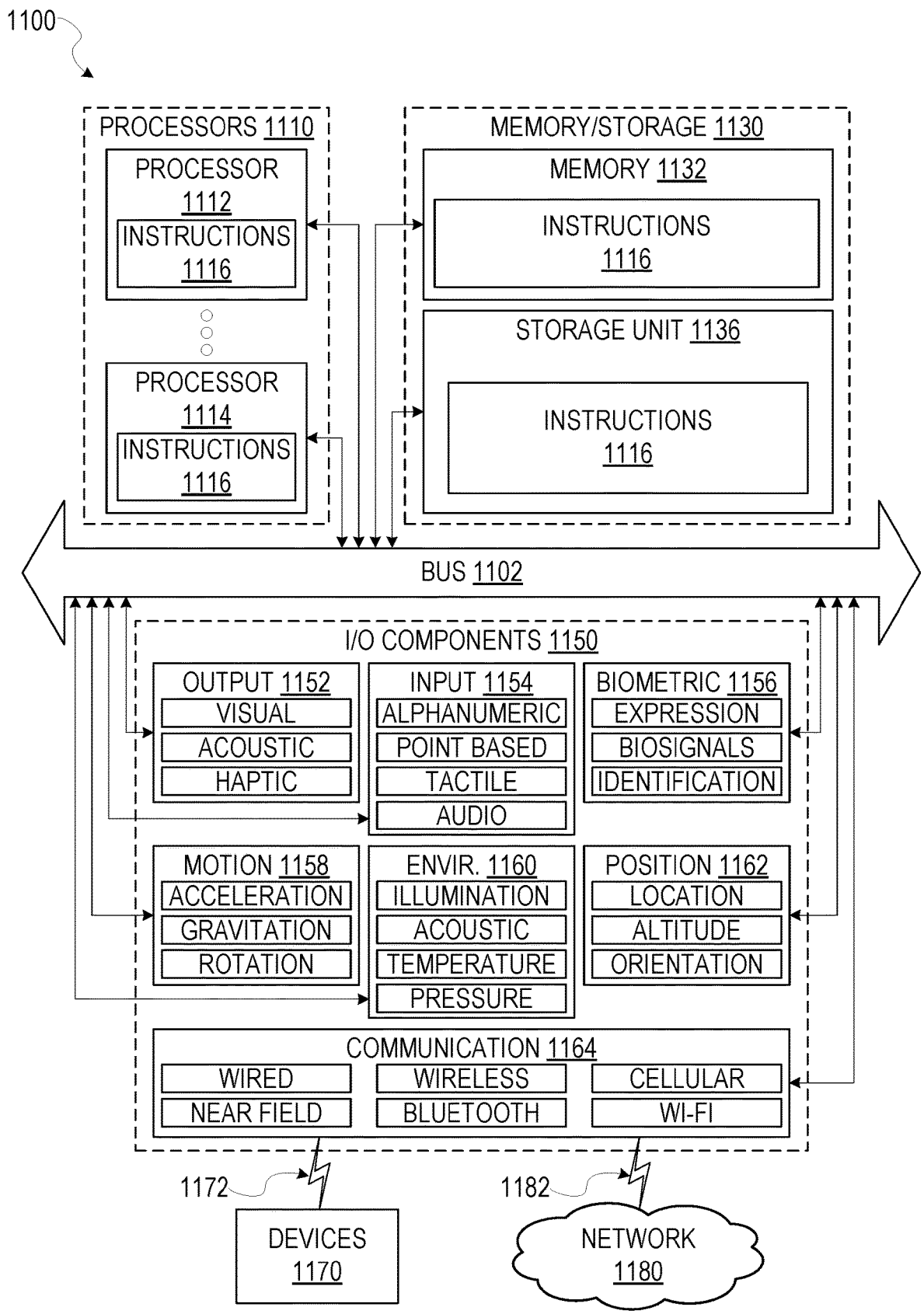
FIG. 11 is a diagrammatic representation of a machine in the example form of a computer system within which a set of instructions may be executed for causing the machine to perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. Additionally, or alternatively, the instructions may implement the modules of FIG. 2. The instructions transform the general, non-programmed machine into a specially configured machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment.

The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1112 and processor 1114 that may execute instructions 1116. The term "processor" is intended to include multi-core processor that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core process), multiple processors with a single core, multiple processors with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of processors 1110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, organic light-emitting diode (OLED), a liquid crystal display (LCD), a projector, or a cathode ray tube (CRT)), electronic paper (e-paper), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172 respectively. For example, the communication components 1164 may include a network interface component or other suitable device to interface with the network 1180. In further examples, communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1180 may be an ad hoc network, an intranet, an extranet, a pager network, a Simple Network Paging Protocol (SNPP), a Telelocator Alphanumeric Protocol (TAP), FLEX, ReFLEX, Post Office Code Standardisation Advisory Group (POCSAG), GOLAY, Enhanced Radio Messaging System (ERMS), and NTT, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
one or more processors; and
a memory storing instructions that, when executed by at least one processor among the one or more processors, cause the system to perform operations comprising:
coupling, via a communication pathway, a client device with an auxiliary device, the auxiliary device comprising a receiver configured to receive data packets from a pager network;
receiving, at the auxiliary device, a data packet that comprises a reference to a data object;
causing the auxiliary device to transmit the reference to the data object to the client device via the communication pathway; and
causing display of a notification at the client device, the notification comprising a display of the data object based on the reference to the data object.

2. The system of claim 1, wherein the data object includes a record within a database.

3. The system of claim 2, wherein the database is a local database of the client device.

4. The system of claim 2, wherein the database is a database of a server system, and the operations further comprise:
    causing the client device to establish a network connection with the server system; and
    accessing the data object at the database of the server system based on the reference.

5. The system of claim 1, wherein the reference includes a memory address.

6. The system of claim 1, wherein the communication pathway includes a wireless connection.

7. The system of claim 6, wherein the wireless connection includes a Bluetooth connection.

8. A method comprising:
    generating a data packet that comprises a reference to a data object and a user identifier;
    identifying an auxiliary device identifier based on the user identifier, the auxiliary device identifier corresponding with an auxiliary device communicatively coupled with a client device via a wireless connection;
    transmitting the reference to the data object to the auxiliary device communicatively coupled with the client device in response to the identifying auxiliary device identifier;
    causing the auxiliary device to transmit the reference to the data object to the client device via the wireless connection; and
    causing display of a notification that includes a display of the data object at the client device based on the reference to the data object.

9. The method of claim 8, wherein the auxiliary device comprises a receiver configured to receive the data packet via a pager network.

10. The method of claim 9, wherein the transmitting the data packet to the auxiliary device communicatively coupled with the client device includes:
    transmitting the data packet to the auxiliary device via the pager network.

11. The method of claim 8, wherein the identifying the auxiliary device identifier based on the user identifier includes:
    receiving an indication of a communication pathway between the auxiliary device and the client device, the indication of the communication pathway including the auxiliary device identifier and the user identifier;
    generating a record of the communication pathway in response to the receiving the indication of the communication pathway; and
    identifying the auxiliary device identifier based on the record that includes the user identifier.

12. The method of claim 11, wherein the communication pathway includes a wireless connection.

13. The method of claim 8, wherein the data object includes a record within a database.

14. The method of claim 13, wherein the database is a local database of the client device.

15. The method of claim 13, wherein the database is a database of a server system, and the reference to the data object includes a memory address of the database of the server system.

16. The method of claim 8, wherein the data object includes a selection of a notification type, and wherein the method further comprises:
    causing display of a notification at the client device based on the notification type of the data object.

17. A non-transitory machine-readable storage medium comprising instructions that, when executed by one or more processors of a machine, cause the machine to perform operations comprising:
    generating a data packet that comprises a reference to a data object and a user identifier;
    identifying an auxiliary device identifier based on the user identifier, the auxiliary device identifier corresponding with an auxiliary device communicatively coupled with a client device via a wireless connection;
    transmitting the reference to the data object to the auxiliary device communicatively coupled with the client device in response to the identifying auxiliary device identifier;
    causing the auxiliary device to transmit the reference to the data object to the client device via the wireless connection; and
    causing display of a notification that includes a display of the data object at the client device based on the reference to the data object.

18. The non-transitory machine-readable storage medium of claim 17, wherein the auxiliary device comprises a receiver configured to receive the data packet via a pager network.

19. The non-transitory machine-readable storage medium of claim 18, wherein the transmitting the data packet to the auxiliary device communicatively coupled with the client device includes:
    transmitting the data packet to the auxiliary device via the pager network.

20. The non-transitory machine-readable storage medium of claim 17, wherein the identifying the auxiliary device identifier based on the user identifier includes:
    receiving an indication of a communication pathway between the auxiliary device and the client device, the indication of the communication pathway including the auxiliary device identifier and the user identifier;
    generating a record of the communication pathway in response to the receiving the indication of the communication pathway; and
    identifying the auxiliary device identifier based on the record that includes the user identifier.

* * * * *